July 10, 1951     R. H. DOBBS     2,559,712
HOLDER FOR VEHICLE LOADING SKIDS
Filed Sept. 9, 1950
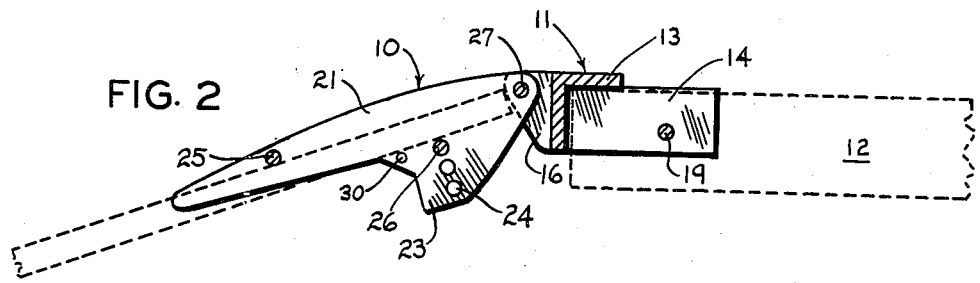
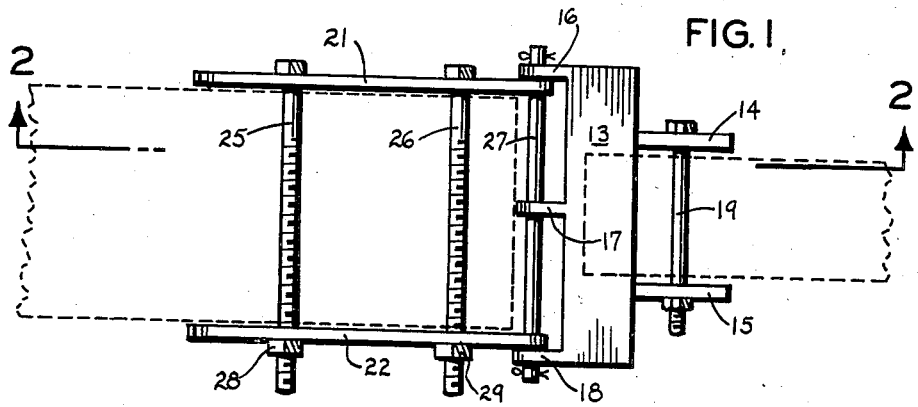
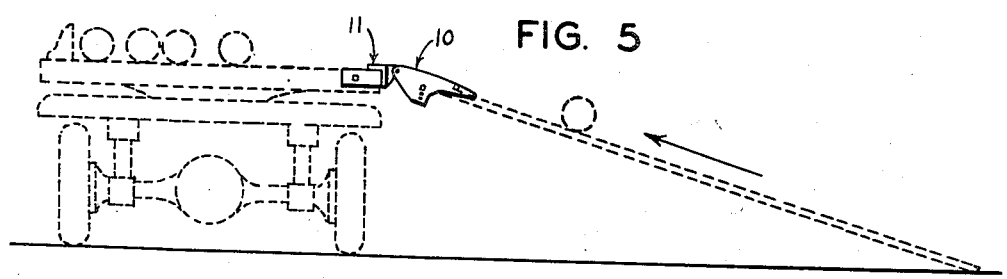
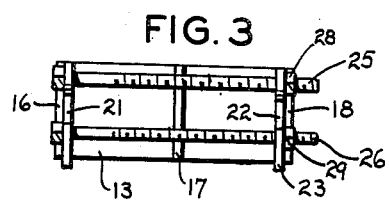
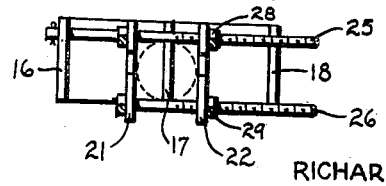
RICHARD H. DOBBS
INVENTOR.
BY Hubert Mill
ATTORNEY Patented July 10, 1951

2,559,712

UNITED STATES PATENT OFFICE 2,559,712

HOLDER FOR VEHICLE LOADING SKIDS

Richard H. Dobbs, Winfield, Kans.

Application September 9, 1950, Serial No. 183,971

7 Claims. (Cl. 193—41)

This invention relates to skid holders and more particularly to holders which can be attached to the standard bolsters of a vehicle, and which will firmly hold the upper end of a skid with its lower end supported on the ground, so that long lengths of pipe, etc. can be rolled or skidded upward along the spaced skids and thus loaded on the vehicle.

It is the chief object of the invention to provide a universal type skid holder—one that will hold the upper ends of various shaped skids.

It is another object to provide a skid holder construction which allows the upper or vehicle supported end of a skid to be quickly and easily clamped firmly in the holder socket, whether the cross sectional shape of the skid is rectangular, square, or round.

It is another object to provide a holder of this type which is capable of standing up under rough usage over a prolonged period of time without affecting its mechanical efficiency—usage in the oil field industry, for instance.

The invention, together with other objects attending its production, will be more clearly understood when the following description is read in connection with the accompanying drawings, in which:

Fig. 1 is a plan view of a holder embodying my invention, a vehicle bolster and the holder supported end of a plank type skid being shown in broken lines;

Fig. 2 is a vertical sectional view taken along the line 2—2 of Fig. 1;

Fig. 3 is an end view of the skid receiving end of the holder, showing its socket adjusted for receiving a wide thick plank type skid;

Fig. 4 is a similar end view, showing the holder socket adjusted for receiving a pipe type skid; and Fig. 5 is a schematic view illustrating the use of the holder.

Referring to Figs. 1, 2, and 3 it will be seen that the skid holder illustrated includes a variable opening skid receiving and clamping socket, designated as a whole by the numeral 10, and a heavy rigid bracket 11 for pivotally connecting one end of the socket to a vehicle bolster 12.

The bracket 11 is made up of a heavy angle iron strip 13, a pair of spaced bolster embracing plates, 14 and 15, each having an end welded to the inside of the angle iron 13, and three spaced pivot ears, 16—17—18, welded to the outside surface of one flange of the angle iron 13, in the positions shown in Figs. 1 and 2.

The plates 14 and 15 are provided with horizontally aligned apertures for receiving a bolt 19, which is passed through a suitably located aperture in the bolster 12, and serves to rigidly secure the bracket to the end of the bolster. The ears 16—17—18 are provided with horizontally aligned apertures for receiving a pivot pin 27, which serves to pivotally support the inner end of the skid receiving socket 10.

This socket 10 includes a pair of elongated side plates, 21 and 22, identical in shape, and preferably having a slightly convex upper edge. The lower edges of these plates include an offset integral ear 23, which is provided with a plurality of vertically spaced perforations 24, the perforations in each plate being located identically intermediate the ends of the plates. Near each of its ends, each plate is provided with an additional perforation.

The two side plates 21 and 22 are loosely connected together by bars 25 and 26, which are preferably in the form of staybolts. The bolt 25 passes through the perforations near the outer ends of the plates, while the bolt 26 passes through similarly located ones of the perforations 24. A pivot pin in the form of a bar or rod 27 is passed through the perforations at the inner end of each plate 21 and 22, and through the aligned perforations in the ears 16—17—18, and thus serves to pivotally connect one end of the socket 10 to the bracket 11. Please note that the plates 21 and 22 are mounted inside the ears 16 and 18, and that these plates are easily slidable toward each other along the bars 25 and 26, and along the pivot pin 27.

The socket 10 then, is so constructed that its skid receiving opening is variable in width and in height. The upper and lower surfaces of the end of a skid are embraced respectively by the bars 25 and 26. If the skid is thin the pin 26 is positioned in the uppermost ones of the perforations 24, as shown clearly in Figs. 2 and 3. The bar 26 may be moved to either of the lower level perforations 24 to accommodate skids of greater thickness. Similarly the plates 21 and 22 may be positioned wide apart to accommodate a wide plank type skid, and the nuts 28 and 29 tightened to clamp these plates against the side surfaces of the skid to firmly hold it in the socket. If a length of heavy pipe or a 4 x 4 is used as a skid, it is only necessary to move the side plates 21 and 22 toward each other until they contact the side surfaces of the skid, and then tighten the nuts 28 and 29 to produce the clamping action.

This invention contemplates the use of means other than the threaded staybolts 25 and 26, and nuts 28 and 29 for urging the two plates 21 and 22 into clamping contact with the sides of a skid.

For instance, the bars 25 and 26 could have smooth instead of threaded surfaces, and a chain or cable passed through identically located perforations 30 in the respective plates, and tightened by any suitable means, such as an off center lever type binder, the construction and operation of which will be well understood by those familiar with this art.

From the above description it will be seen that I have provided a skid holder which can be easily and quickly attached to the bolster of any vehicle, and which has a variable opening socket for receiving and supporting the upper end of skids of various sizes and shapes.

Having described the invention with sufficient clarity to enable those familiar with this art to construct and use it, I make the following claims, which are considered to specifically define the patent protection to which I am entitled:

1. A holding device for vehicle loading skids, in combination with a bolster mounted on the vehicle, said device comprising: a bracket rigidly connected to an end of the bolster and including a pair of outwardly projecting horizontally spaced pivot ears; and a variable opening socket having one end pivotally connected between said pivot ears and its other end projecting outwardly to receive and support an end of a loading skid.

2. The invention described in claim 1 and means for varying the length and width of the opening in said socket.

3. The invention described in claim 1 in which the socket includes a pair of elongated horizontally spaced side plates, and stay bolts slidably connecting said plates and defining the upper and lower edges of the opening in the socket.

4. A holding device for a vehicle loading skid, in combination with a bolster mounted on the vehicle, said device comprising: a pair of elongated parallel spaced side plates adapted to embrace the sides of one end of a loading skid; a pair of parallel horizontally disposed bars slidably connecting said plates at longitudinally and vertically spaced points, and adapted to receive between them and embrace the upper and lower surfaces of said one end of a loading skid, the lower level bar being located intermediate the ends of said plates, and the higher level bar being located near the outer ends thereof; and a bracket pivotally connecting the inner ends of said plates to the vehicle bolster on a horizontal pivot axis, the plates being movable along said axis.

5. The invention described in claim 4 in which the bracket includes a pair of spaced outwardly projecting ears having horizontally aligned perforations, and a pivot pin passing through said perforations and through the inner ends of said plates, the plates being slidable on the pivot pin.

6. The invention described in claim 4 and means for urging the plates toward each other along the bars.

7. A skid holder including in combination a bolster equipped vehicle; a bracket rigidly connected to an end of the bolster and including a pair of horizontally spaced rigid pivot ears having aligned perforations therein; a pair of elongated skid supporting plates each having a perforation in one end; an elongated pivot pin passing through the perforations in said ears and in said plates, the plates being positioned inside said spaced ears, and being slidable toward and away from each other on said pivot pin; a second perforation near the opposite end of each plate; a first stay bolt passed through the last named perforations, the plates being slidable along the stay bolt; a third perforation in each plate at aligned points lying outside and below a plane passing through the first stay bolt and the pivot pin; and a second stay bolt passing through said third perforations, said stay bolts being adapted to draw the plates together to tightly embrace the end of a skid positioned between the plates and between said stay bolts.

RICHARD H. DOBBS.

No references cited.